US006934953B2

(12) United States Patent
Stevens

(10) Patent No.: US 6,934,953 B2
(45) Date of Patent: Aug. 23, 2005

(54) DEFERRED PROCEDURE CALL IN INTERFACE DESCRIPTION LANGUAGE

(75) Inventor: Luis F. Stevens, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 09/997,669

(22) Filed: Nov. 28, 2001

(65) Prior Publication Data

US 2003/0101293 A1 May 29, 2003

(51) Int. Cl.[7] .......................................... G06F 15/163
(52) U.S. Cl. ..................................................... 719/310
(58) Field of Search ................................ 719/310, 330

(56) References Cited

U.S. PATENT DOCUMENTS

| | | | | |
|---|---|---|---|---|
| 6,105,059 | A | * | 8/2000 | Al-Karmi et al. ........... 709/219 |
| 6,192,418 | B1 | * | 2/2001 | Hale et al. .................. 719/312 |
| 6,253,252 | B1 | * | 6/2001 | Schofield .................... 719/315 |
| 6,751,798 | B1 | * | 6/2004 | Schofield .................... 719/330 |

OTHER PUBLICATIONS

Waddington and D. Hutchison, Supporting Multimedia in Distributed Object Environments, 1998.*
Rajesh Krishna Balan, Performance Analysist of the Intel IXP 1200 Network Processor, Oct. 20, 2000.*
The Common Object Request Broker: Architecture and Specification, Rev. 2.3.1, the Object Management Group, Oct. 1999, Chapters 1, 2 and 3.

* cited by examiner

Primary Examiner—Meng-Al T. An
Assistant Examiner—LeChi Truong
(74) Attorney, Agent, or Firm—Blakely, Sokoloff, Taylor and Zafman

(57) ABSTRACT

Described is a distributed processing system comprising a plurality of processing objects and an object management system. At least two of the processing objects comprise an interface in the object management system defining a bi-directional non-blocking procedure call from first processing object to a second processing object according to an interface definition language.

25 Claims, 2 Drawing Sheets

Interface <name> {
    <oneway|twoway|deferred> <type> <function_name> (<arguments>);

DEFERRED PROCEDURE CALL IN INTERFACE DESCRIPTION LANGUAGE

BACKGROUND

1. Field

The subject matter disclosed herein relates to distributed processing systems. In particular, the subject matter disclosed herein relates to inter-processing object procedure calls defined according to an interface description language (IDL).

2. Information

Real-time computing solutions are typically implemented as distributed processing systems in which a plurality of processing objects execute tasks to meet requirements of the real-time computing solution. Each processing object may comprise an interface which defines objects in an object management system (OMS). The OMS may enable the processing objects in the distributed processing system to communicate through procedure calls whereby a calling processing object initiates a procedure call to a called processing object.

Processing objects in a distributed processing system may communicate with one another in an OMS according to an interface description language (IDL). Such an IDL may define constructs such as formats of procedure calls to be initiated by a calling processing object to a called processing object. In response to the procedure call, the called processing object may provide a return value to the calling processing object through the OMS. There is a need to provide constructs in an IDL to facilitate flexibility in communication among processing objects in a distributed processing system.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figures 1, 2:
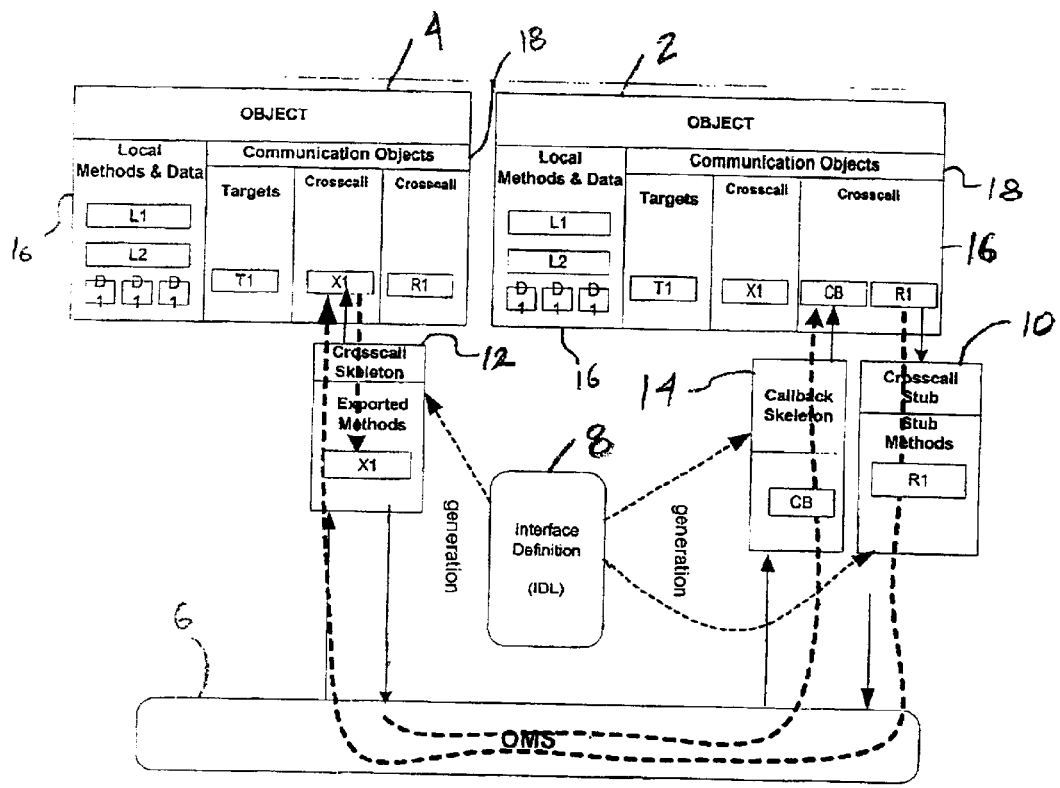
FIG. 1 shows a schematic diagram of a distributed processing system according to an embodiment of the present invention.
FIG. 2 shows a syntactical format of a procedure call in an interface description language according to an embodiment of the present invention illustrated in FIG. 1.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be interpreted by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions. Such a storage device may comprise any media for storing information such as, for example, semiconductor, optical or magnetic storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a storage medium in combination with processing circuitry to execute the machine-executable instructions. However, these are merely examples of structures which may provide logic and embodiments of the present invention are not limited in this respect.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device." For example, a peripheral device may provide inputs to or receive outputs from an application process hosted on the host processing system. However, embodiments of the present invention are not limited in this respect.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a bus structure wherein one device transmits data addressed to the other device through the bus structure.

A "processing core" as referred to herein relates to a processing circuit comprising logic to execute machine-readable instructions. For example, a processing core may sequentially execute instructions stored in a memory to process data items indicated by or referenced in such instructions. However, this is merely an example of a processing core and embodiments of the present invention are not limited in this respect.

A processing core may comprise a plurality "microengine processing elements" to repetitively execute instructions to process data in a particular format or array. Each microengine processing element in a processing core may be adapted to process portions of each data packet received from a transmission media interface. However, this is merely an example of microengine processing elements in a processing core and embodiments of the present invention are not limited in this respect.

A "processing object" as referred to herein relates to a self contained entity hosted on a processing system comprising data, and one or more procedures to manipulate such data. However, this is merely an example of a processing object and embodiments of the present invention are not limited in this respect. A "distributed processing system" as referred to herein relates to a processing system comprising a plurality of processing objects that communicate in an "object management system." The processing objects of a distributed processing system may be hosted on a single processing core, or multiple processing cores. An object management system may define common data objects among processing objects in a distributed processing system. For example, an object management system may comprise a memory, data bus or data transmission network to enable processing objects to define common data items according to an interface between or among processing objects. However, these are merely example of a distributed processing system and an object management system, and embodiments of the present invention are not limited in these respects.

An "interface definition language" as referred to herein relates to a vocabulary and syntax defining how processing objects may communicate with one another in a processing system. For example, an interface definition language may define constructs for processing objects to communicate through an object management system in a distributed processing system. An interface definition language may define one or more "procedures" in a library which may be invoked by a first processing object to request an action or task to be carried out by a second processing object. Source code associated with a processing object may comprise instructions expressed in an interface definition language which may be compiled to provide executable images enabling the processing object to communicate with one or more other processing objects in an object management system. However, these are merely examples of an interface definition language and embodiments of the present invention are not limited in these respects.

A "procedure call" as referred to herein relates to an invocation of a procedure by a processing object (a "calling" processing object) to request an action or task to be executed by a second processing object (a "called" processing object). The procedure call may also request that the called processing object return a value or result to the calling processing object. However, this is merely an example of a procedure call and embodiments of the present invention are not limited in this respect.

A procedure call may be expressed in an interface definition language in source code associated with a calling processing object. Compiling the source code may provide a "crosscall stub" image to notify a called processing object of an invocation of the procedure call through an object management system. To enable providing a return value, such a compilation of the source code may also provide a "callback skeleton" image to receive the return value from a called processing object through the object management system. Similarly, source code associated with the called processing object may be compiled to provide a "crosscall skeleton" to respond an invocation of the procedure call from a crosscall stub of a called processing object. However, these are merely examples of a crosscall stub, callback skeleton and crosscall skeleton, and embodiments of the present invention are not limited in these respects.

A "blocking" procedure call as referred to herein relates to a procedure call in which a calling processing object invoking the procedure call suspends execution pending receipt of a result from the procedure call. A "non-blocking" or "deferred" procedure call as referred to herein relates to a procedure call in which a calling processing object invoking the procedure call receives a return value or result from the procedure call but does not necessarily suspend execution pending receipt of the return value or result. In one example, a return value or result from a non-blocking procedure call may be provided to the calling processing object in an interrupt to the execution of the calling processing object. In another example, the return value or result may be processed in an execution cycle of a processing loop by the calling processing object subsequent to receipt of the return value or result. However, these are merely examples of a non-blocking or deferred procedure call, and embodiments of the present invention are not limited in these respects.

A distributed processing system may define multiple "planes" of processing objects hosted on the distributed processing system. A plane may associate processing objects according to their relevance in a layered processing stack (e.g., layers in a network processing system or device driver). Each plane may define an application programming interface (API) comprising routines or protocols for building software applications. A distributed processing system for the processing of data network traffic may define a "control plane" and a "data plane" comprising processing objects providing one or more APIs. For example, a data plane may comprise processing objects to perform data packet classification and forwarding tasks. A control plane may comprise processing objects to perform exception handling for processing objects in the data plane. However, these are merely examples of how a distributed processing system may define multiple planes of processing objects and embodiments of the present invention are not limited in these respects.

Briefly, an embodiment of the present invention is directed to a distributed processing system comprising a plurality of processing objects and an object management system. At least two of the processing objects comprise an interface in the object management system defining a bi-directional, non-blocking or deferred procedure call from first processing object to a second processing object according to an interface definition language. However, this is merely an example embodiment and other embodiments of the present invention are not limited in these respects.

FIG. 1 shows a distributed processing system according to an embodiment of the present invention. A first processing object 2 communicates with a second processing object 4 through an object management system (OMS) 6. The first and second processing objects 2 and 4 may be hosted on a common processing core (not shown). Alternatively, the first and second processing objects 2 and 4 may each be hosted on different, distinct processing cores. However, these are merely examples of how different processing objects may be hosted in a distributed processing system and embodiments of the present invention are not limited in these respects.

The first and second processing objects 2 and 4 may be related to one another in the distributed processing system according to any of several multi-object distributed processing architectures. For example, the first and second processing objects 2 and 4 may be related as a server and client whereby one of the processing objects (acting as a server) provides a service in response to requests from a second processing object (acting as a client). Also, the first and second processing objects 2 and 4 may be related as an agent and manager whereby one of the processing objects (acting as an agent) gathers information from or monitors an environment on behalf of a second processing object (acting as a manager). In another example, the first and second processing objects 2 and 4 may reside in adjacent layers of an implementation of a communication stack (e.g., in a device driver) where an interface between the adjacent layers comprises data objects in the OMS 6 which are common among interfaces to the processing objects. In yet another example, the first and second processing objects 2 and 4 may comprise peer processing objects. However, these are merely examples of how different processing objects in a distributed processing system may relate to one another and embodiments of the present invention are not limited in these respects.

In the illustrated embodiment, each of the processing objects 2 and 4 may define local objects 16 which are concealed from the OMS 6. Each of the processing objects 2 and 4 may define communication objects 18 which comprise data objects accessible to, or visible from the OMS 6. For example, the communication objects 18 may define one or more procedure calls which may be initiated by a calling processing object and directed to a called processing object. However, these are merely examples of local objects and communication objects of processing objects in a distributed processing system, and embodiments of the present invention are not limited in this respect.

According to an embodiment, the OMS 6 may facilitate communication between the first and second processing objects 2 and 4 using any one of several techniques known to those of ordinary skill in the art. For example, the OMS 6 may comprise a shared memory array which defines data buffers shared by the processing objects 2 and 4. Alternatively, the OMS 6 may comprise a data communication network enabling the transmission of data between the processing objects 2 and 4 according to a data communication protocol. Also, alternatively, the OMS 6 may comprise a data bus in a backplane to transmit data between the processing objects 2 and 4 using read or write bus transactions. However, these are merely examples of how an OMS may be implemented in a distributed processing system and embodiments of the present invention are not limited in these respects.

In the illustrated embodiment, an interface definition language (IDL) 8 defines constructs to facilitate communication between or among processing objects in the distributed processing system. For example, the IDL 8 may specify a syntax for invoking procedure calls between the processing objects 2 and 4. Additionally, the IDL 8 may define data types to be provided as arguments in such procedure calls. However, this is merely an example of an interface description language to define constructs for communication among processing objects in a distributed processing system, and embodiments of the present invention are not limited in this respect.

In the illustrated embodiment, the IDL 8 also provides direction semantics and synchronization semantics in a procedure call. For example, such a procedure call may employ direction semantics to specify whether the procedure call is a one-way or two-way procedure call. Such a procedure call may also employ synchronization semantics to specify whether the procedure call is to have blocking or non-blocking/deferred behavior. However, these are merely examples of how an IDL may provide direction semantics and synchronization semantics in a procedure call and embodiments of the present invention are not limited in this respect.

The processing objects 2 and 4 may execute from compiled images of source code. Such source code may comprise one or more procedure calls formatted according to the IDL 8. A procedure call formatted according to the IDL 8 may be compiled to form a crosscall stub image 10 at a calling processing object. A corresponding crosscall skeleton image 12 may be formed in a compilation at a called processing object which is to respond to the procedure call. A two-way procedure call formatted according to the IDL 8 may also form a callback skeleton image 14 at the calling processing object to receive and process responses to two-way procedure calls from a called processing object.

In the illustrated embodiment, the processing object 2 may initiate a procedure call to the processing object 4 by initiating the execution of machine-readable instructions of the crosscall stub image 10 to notify the processing object 4 of the procedure call. Such machine-readable instructions may be derived from a procedure call which is formatted according to a procedure call format defined in the IDL 8. Execution of the machine-readable instructions may invoke the procedure call at the crosscall skeleton 12 by, for example, initiating an interrupt to the processing object 4, enqueuing a request in an event queue of the processing object 4 or periodically polling the processing object 4. However, these are merely examples of how a calling processing object may notify a called processing object of a procedure call and embodiments of the present invention are not limited in these respects.

According to an embodiment, the calling processing object 2 may receive a response to a two-way procedure call from the OMS 6 at the callback skeleton image 14 "synchronously" (e.g., in response to a blocking procedure call) or "asynchronously" (e.g., in response to a non-blocking procedure call). In the synchronous case, the calling processing object 2 has suspended execution and resumes execution upon receipt of the response at the callback skeleton image 14. In the asynchronous case, the calling processing object 2 may return immediately following invocation of a procedure call and receive a response at the callback skeleton image 14 from the OMS 6 as an interrupt to a current thread of execution, as an input to an event loop or as a polling event. However, these are merely examples of how a calling object may receive a response to a procedure call at a callback skeleton and embodiments of the present invention are not limited in this respect.

FIG. 2 shows a syntactical format 100 of an interface definition of a procedure call in an IDL according to an embodiment of the present invention illustrated in FIG. 1. A procedure call in source code may be expressed in the syntactical format 100. The syntactical format 100 comprises an interface name word 102, callback status word 104, a return value type word 106 and one or more procedure arguments 110. The interface name word 102 may specify an interface to a called processing object (e.g., called processing object 4) in the OMS 6 defined according to the aforementioned IDL.

For example, in source code associated with a calling processing object, the interface name word 102 may be uniquely associated with a called processing object to which the procedure call is addressed. Compilation of a procedure call interface definition in source code according to format 100 may then provide a crosscall stub image associated with a calling processing object to invoke a procedure call in the context of the called processing object as indicated by the interface name word 102. The crosscall stub image may export a procedure call invoked by the calling processing object to translate the procedure invocation to messages transmitted to a called processing system through an OMS. Compilation of a procedure call interface definition in the source code format 100 may also provide a crosscall skeleton image associated with a called processing object to respond to invocations of the procedure and translate the invocation into locally defined procedures and functions and a callback skeleton image associated with the calling processing object to receive callback invocations asynchronously from the called processing object. However, this is merely an example of how the source code of a procedure call may be compiled to provide a crosscall stub, a crosscall skeleton and a callback skeleton, and embodiments of the present invention are not limited in this respect.

The procedure name word 108 may specify a procedure in a library of the called processing object (e.g., in communication objects 18 of a called processing object as illustrated in FIG. 1). Such a procedure may be invoked by a crosscall stub of the calling processing object at a crosscall skeleton at a called processing object referenced in the interface name word 102. The arguments 110 may specify arguments for this procedure as defined in a library of procedures of the IDL.

According to an embodiment, a crosscall stub of a calling processing object may invoke a procedure call at a crosscall skeleton of a called processing requesting a return value to be provided by the called processing object. The crosscall skeleton may then provide the return value specified upon execution of the procedure. The crosscall stub may define a locally defined object to assume the return value to be accessible by the calling processing object. However, this is merely an example of how a calling processing object may receive a return value in response to a procedure call to a called processing object and embodiments of the present invention are not limited in this respect.

In the illustrated embodiment, the callback status word 104 may comprise an identifier to specify in an interface definition that a procedure call according to the format 100 is either a "one-way" procedure call, a "two-way" procedure call, or a "deferred" (or "non-blocking") procedure call. A one-way procedure call may request that the called processing object perform a task specified by the procedure associated with the procedure name 108 but no return value is to be returned to the calling object in response to the procedure call. A two-way procedure call, on the other hand, requests that the called processing object provide a return value in response to the procedure call. Following an initiation of a two-way procedure call, a callback skeleton associated with the calling processing object may suspend execution until receipt of the requested return value from the crosscall skeleton of the called processing object. Upon receipt of the return value, the calling processing object may commence execution.

If a calling processing object specifies an identifier in the callback status word 104 indicating a deferred procedure call, a callback skeleton image associated with the calling processing procedure need not suspend execution and may enable the calling processing procedure to continue execution following invocation of the procedure call and prior to receipt of a return value at the callback skeleton. For example, upon invocation of a deferred procedure call at a calling processing object, an associated crosscall stub may immediately invoke a return to enable the calling processing object to execute subsequent instructions prior to receipt of a return value (in contrast to a synchronous two-way procedure call where a crosscall stub invokes a return upon receipt of a return value). Accordingly, called processing object may continue executing tasks prior to receipt of a return value from the called processing object. Upon receipt of a return value at the callback skeleton, the calling processing object may then continue executing tasks based upon the return value.

According to an embodiment, a calling processing object invoking a deferred procedure call (as specified in the callback status word 104) may receive a return value at a callback skeleton as an interrupt to execution of a task or tasks at the calling processing object. That is, following the invocation of the deferred or non-blocking procedure call, the calling processing object may continue executing other tasks and receive the return value as an interrupt to the execution of these other tasks. Alternatively, the calling processing object may execute a processing loop of instructions and process the return value in a cycle of the processing loop subsequent to receipt of the return value at a callback skeleton. However, these are merely examples of how a calling processing object may process a return value following a deferred procedure call and embodiments of the present invention are not limited in this respect.

In the illustrated embodiment, the format 100 may be provided in an IDL as a template for a source code instruction for defining a procedure call. Accordingly, application programmers may include one or more such procedure calls according to the interface definition format 100 in a source code listing to be executed by a calling processing object. Once defined as a source code instruction in the interface definition format 100, a procedure call may be compiled by a compilation process to provide one or more object code instructions. Compilation of a procedure call in a source code instruction as formatted in the interface definition format 100 may provide object code images for a crosscall stub and a callback skeleton. Assemblers, linkers and loaders may then convert the object code instructions to machine-readable instructions which are executable by a target processor during real-time execution. For example, assemblers, linkers and loaders may associate or link assembled images of a crosscall stub and callback skeleton with an assembled image of a crosscall skeleton. However, these are merely examples of how a procedure call in an IDL may be formatted for execution and embodiments of the present invention are not limited in these respects.

Figure 3:
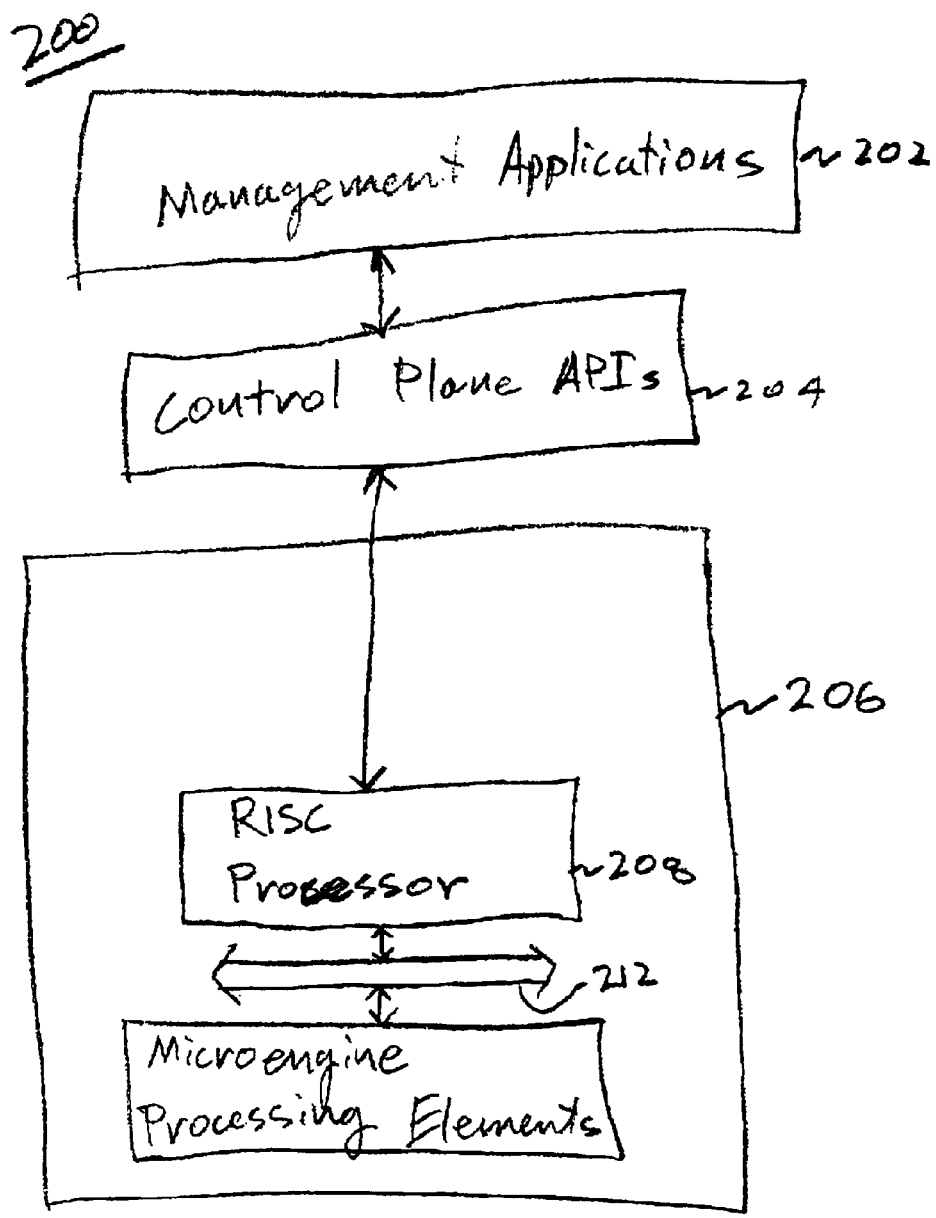
FIG. 3 shows a network processing system according to an embodiment of the present invention.

FIG. 3 illustrates a network processing system according to an embodiment of the present invention. A processing core 206 comprises microengine processing elements 210 and a reduced instruction set computer (RISC) processor 208 coupled by a data bus 212. A media switch or switch fabric (not shown) may receive data packets on ingress communication ports to be forwarded to destinations through egress communication ports. In the illustrated embodiment, the processing core 206 may host a distributed processing system to control the forwarding of data packets in the media switch from ingress communication ports to egress communication ports according to one or more network management policies. For example, microengine processing elements 210 may execute processes to perform, for example, data packet classification and forwarding procedures. The RISC processor 208 may host one or more processing objects to perform, for example, communication protocol stack processing and handling exceptions from the microengine processing elements 210.

In the illustrated embodiment, a distributed processing system may define a control plane and a data plane where the data plane and control plane each comprise processing objects hosted on the RISC processor 208. The processing objects of the control plane may, for example, define routing policies and support network services according to policies such as quality of service (QoS). One or more processing objects of the control plane may comprise an interface in an OMS to provide one or more application programming interfaces (APIs) 204 supporting management applications 102. Accordingly, the management applications 102 may define or characterize policies to be implemented in the control plane through the control plane APIs. The processing objects of the data plane may, for example, execute data packet classification and forwarding procedures. The processing objects of the data plane may also initiate exceptions to be handled by the control plane.

According to an embodiment, the processing objects of the control and data planes may execute machine-readable instructions derived from a source code module. Such a source code module may comprise procedure call instructions formatted according to an IDL as indicated by the format 100 shown in FIG. 2. Such procedure call instructions may specify an interface in an OMS using an identifier in the name word 102. The identifier may correspond with a processing object in either the control or data planes. Additionally, the instruction for the procedure call may specify a one-way or two-way procedure call, and also specify whether such a two-way procedure call is deferred or non-blocking procedure call in callback status word 104. The source code module may then be compiled to provide an object code image comprising a crosscall stub and a callback skeleton. The object code image may then assembled and linked with other assembled modules in the distributed processing system.

One or more processing objects of the control plane may comprise an interface in an OMS with one or more processing objects in the data plane. Such an interface may define procedure calls according to an IDL as discussed above with reference to FIG. 2. For example, a calling processing object in the control plane may initiate a deferred or non-blocking procedure call to a called processing object in the data plane according to the format 100 by indicating a deferred procedure call in the callback status word 104. Such a procedure call instruction may be compiled to provide a crosscall stub image to initiate the procedure call in the OMS and to provide a callback skeleton image to enable the calling processing procedure in the control plane to continue execution prior to receipt of a return value at the callback skeleton.

A calling processing object in the data plane may similarly initiate a deferred procedure call to a called processing object in the control plane according to the format 100. In either case, a callback skeleton enables the calling processing object to execute prior to receipt of a return value at the callback skeleton. However, these are merely examples of how a calling processing object may initiate a deferred procedure call to a called processing object in a distributed processing system and embodiments of the present invention are not limited in these respects.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A distributed processing system comprising:

a plurality of processing objects; and an object management system, wherein at least two of the processing objects comprise an interface in the object management system defining a deferred procedure call from first processing object to a second processing object according to an interface definition language, the interface definition language including a source code instruction having a syntax including an "interface" keyword, an interface name, a return value type, a function name, at least one function argument, and an identifier from a set of values that includes an identifier of a one-way procedure call, an identifier of a two-way blocking procedure call, and an identifier of a deferred procedure call;

wherein the first processing object comprises:

logic to execute a crosscall stub to initiate the procedure call to the second processing object; and logic to execute a callback skeleton in response to receipt of a return value from the second processing object, wherein the crosscall stub and callback skeleton are derived from a compilation of the deferred procedure call instruction formatted according to the interface description language.

2. The distributed processing system of claim 1, the distributed processing system further comprising:

a control plane comprising at least one processing object; and a data plane comprising at least one processing object, wherein the interface in the object management system defines a deferred procedure call from a processing object in the control plane to a processing object in the data plane.

3. The distributed processing system of claim 2, wherein the processing object in the data plane comprises an interface to one or more microengine processes.

4. The distributed processing system of claim 1, the distributed processing system further comprising:

a control plane comprising at least one processing object; and a data plane comprising at least one processing object, wherein the interface in the object management system defines a non-blocking procedure call from a processing object in the control plane to a processing object in the data plane.

5. The distributed processing system of claim 4, wherein the processing object in the data plane comprises an interface to one or more microengine processes.

6. The distributed processing system of claim 1, wherein the second processing object comprises logic to execute a crosscall skeleton in response to a procedure call from the crosscall stub.

7. The distributed processing system of claim 6, wherein the crosscall stub and callback skeleton comprise image generated from a compilation of a single procedure call interface definition formatted according to the interface description language, and wherein the second processing object comprises logic to asynchronously call back the first processing object in response to the procedure call.

8. A processing system comprising:

a first processing core adapted to process information in data packets received from a transmission medium; and a second processing core comprising:

a plurality of processing objects, at least one processing object having an interface with one or more processes hosted on the first processing core; and an object management system, wherein at least two of the processing objects comprise an interface in the object management system defining a deferred procedure call from first processing object to a second processing object according to an interface definition language, the interface definition language including a source code instruction having a syntax including an "interface" keyword, an interface name, a return value type, a function name, at least one function argument, and an identifier from a set of values that includes an identifier of a one-way procedure call, an identifier of a two-way blocking procedure call, and an identifier of a deferred procedure call;

wherein the first processing object comprises:

logic to execute a crosscall stub to initiate the procedure call to the second processing object; and logic to execute a callback skeleton in response to receipt of a return value from the second processing object, wherein the crosscall stub and callback skeleton are derived from a compilation of the deferred procedure call instruction formatted according to the interface description language.

9. The processing system of claim 8, wherein the first processing core comprises a plurality of microengine processing elements.

10. The processing system of claim 8, the processing system further comprising:

a control plane comprising at least one processing object; and a data plane comprising at least one processing object, wherein the interface in the object management system defines a deferred procedure call from a processing object in the control plane to a processing object in the data plane.

11. The processing system of claim 10, wherein the processing object in the data plane comprises an interface to one or more microengine processes.

12. The processing system of claim 8, the distributed processing system further comprising:

a control plane comprising at least one processing object; and a data plane comprising at least one processing object, wherein the interface in the object management system defines a non-blocking procedure call from a processing object in the control plane to a processing object in the data plane.

13. The processing system of claim 12, wherein the processing object in the data plane comprises an interface to one or more microengine processes.

14. The processing system of claim 8, wherein the second processing object comprises logic to execute a crosscall skeleton in response to a procedure call from the crosscall stub.

15. The processing system of claim 8, wherein the crosscall stub and callback skeleton comprise image generated from a compilation of a single procedure call interface definition formatted according to the interface description language, and wherein the second processing object comprises logic to asynchronously call back the first processing object in response to the procedure call.

16. A computerized method for distributed processing system comprising:

accessing a deferred procedure call instruction in a source code module corresponding with a first processing object, the deferred procedure call instruction being formatted according to an interface description language, the interface instruction having a syntax including an "interface" keyword, an interface name, a return value type, a function name, at least one function argument, and an identifier from a set of values that includes an identifier of a one-way procedure call, an identifier of a two-way blocking procedure call, and an identifier of a deferred procedure call;

compiling the source code module to provide a crosscall stub image and a callback skeleton image based upon the deferred procedure call instruction, wherein the callback skeleton image comprises instructions enabling execution of the first processing object following a procedure call to a second processing object and prior to receipt of a return value at the callback skeleton.

17. The method of claim 16, wherein the method further comprises linking the crosscall stub image and callback skeleton image with a crosscall skeleton image associated with the second processing object.

18. The method of claim 17, wherein the first processing object comprises a processing object in a control plane of a distributed processing system and the second processing object comprises a processing object in a data plane of the distributed processing system.

19. The method of claim 17, wherein the first processing object comprises a processing object in a data plane of a distributed processing system and the second processing object comprises a processing object in a control plane of the distributed processing system.

20. The method of claim 16, wherein the syntax comprises a syntax of: interface <name> {oneway|twoway|deferred} <type> <function$_{13}$name> (<arguments>).

21. An computer executable program product on a storage medium comprising machine-readable instructions for:

accessing formatting a deferred procedure call instruction in a source code module corresponding with a first processing object, the deferred procedure call instruction being formatted according to an interface description language, the interface instruction having a syntax including an "interface" keyword, an interface name, a return value type, a function name, at least one function argument, and an identifier from a set of values that includes an identifier of a one-way procedure call, an identifier of a two-way blocking procedure call, and an identifier of a deferred procedure call; and compiling the source code module to provide a crosscall stub image and a callback skeleton image based upon the deferred procedure call instruction, wherein the callback skeleton image comprises instructions enabling execution of the first processing object following a procedure call to a second processing object and prior to receipt of a return value at the callback skeleton.

22. The article of claim 21, wherein the storage medium further comprises machine-readable instructions stored thereon for linking the crosscall stub image and callback skeleton image with a crosscall skeleton image associated with the second processing object.

23. The article of claim 22, wherein the first processing object comprises a processing object in a control plane of a distributed processing system and the second processing object comprises a processing object in a data plane of the distributed processing system.

24. The article of claim 22, wherein the first processing object comprises a processing object in a data plane of a distributed processing system and the second processing object comprises a processing object in a control plane of the distributed processing system.

25. The article of claim 21, wherein the syntax comprises a syntax of: interface <name> {oneway|twoway|deferred} <type> <function$_{13}$name> (<arguments>).

* * * * *

UNITED STATES PATENT AND TRADEMARK OFFICE
CERTIFICATE OF CORRECTION

PATENT NO. : 6,934,953 B2  Page 1 of 1
DATED : August 23, 2005
INVENTOR(S) : Stevens It is certified that error appears in the above-identified patent and that said Letters Patent is hereby corrected as shown below:

Column 12,
Lines 28 and 65, delete "<function$_{13}$name>" and insert -- <function_name> --.

Signed and Sealed this

Twenty-fifth Day of October, 2005

JON W. DUDAS
*Director of the United States Patent and Trademark Office*